Aug. 9, 1938.  T. M. MORAN  2,126,271
APPARATUS FOR EQUALIZING THE TENSION ON A PLURALITY OF THREADS
Filed March 26, 1935  2 Sheets-Sheet 1
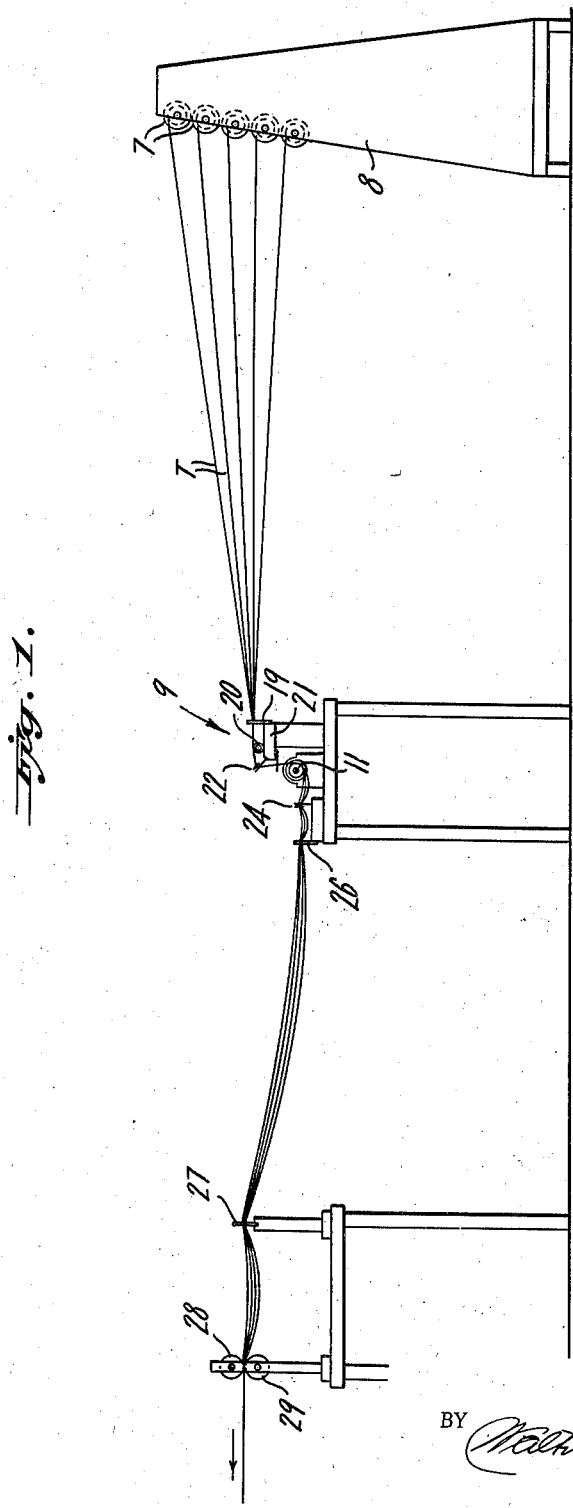
INVENTOR.
TAYLOR M. MORAN
BY
ATTORNEY.

Aug. 9, 1938.   T. M. MORAN   2,126,271
APPARATUS FOR EQUALIZING THE TENSION ON A PLURALITY OF THREADS
Filed March 26, 1935   2 Sheets-Sheet 2
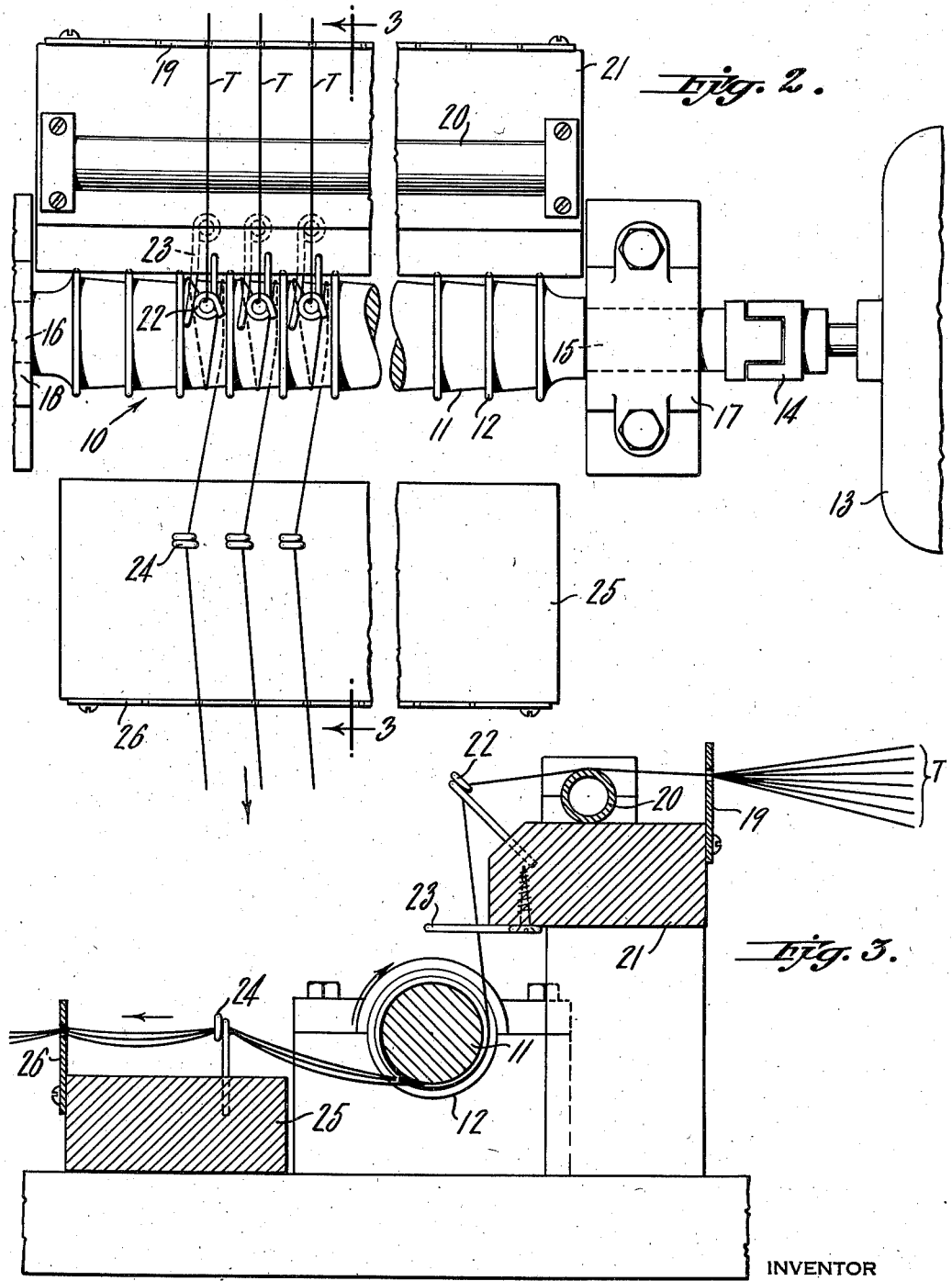
INVENTOR
TAYLOR M. MORAN
BY
ATTORNEY Patented Aug. 9, 1938

2,126,271

UNITED STATES PATENT OFFICE 2,126,271

APPARATUS FOR EQUALIZING THE TENSION ON A PLURALITY OF THREADS

Taylor M. Moran, Montreal, Quebec, Canada, assignor to United States Rubber Products, Inc., New York, N. Y., a corporation of Delaware Application March 26, 1935, Serial No. 13,098

4 Claims. (Cl. 28—35)

This invention relates to apparatus for equalizing the tension on a plurality of threads but is designed more particularly for use in equalizing the tension of rubber threads such as rubber warp threads.

In cutting rubber thread from sheet material on cutting drums, the slit sheets, usually 75 to 150 yards in length, after removal from the drums are inspected and then laid out on long tables. The threads on the tables are divided into the desired number of warps each having the required number of ends of rubber thread, and the ends in each warp are leased with string to insure freedom from crossing of the threads when they are utilized in subsequent operations, as in beaming prior to weaving. The threads are balanced by a hand operation of raising and lowering the warps and separating the threads with the fingers along the length of the table so that the threads will be in a perfectly balanced condition and free of tension before chain looping, which is the usual packaging operation for warps of rubber thread. The chain looping operation provides chains of rubber threads which may be easily transported and which may readily be pulled out straight after delivery and wound up on beams under the desired tension for the looms on which they are to be utilized. In the method of manufacturing rubber thread as shown for example in Patents Nos. 1,545,257; 1,947,080 and 1,947,090, where an aqueous dispersion of rubber, such as latex, is streamed through a series of orifices or spinnerets into a coagulant and the filamentary coagula thus formed are transferred from the coagulant to subsequent operations such as drying and vulcanizing to form finished rubber thread, threads of any desired length may be produced. Commonly, warps of rubber thread produced by this method are required in lengths upwards of 200 and 300 yards, and in such cases, the difficulties of balancing the threads by the table method are many times multiplied over those difficulties found in the shorter lengths of cut thread, partially at least because of the length limitations of tables on which the whole length of threads should be laid out for proper balancing.

By the present invention, rubber threads of any length and produced by any method may be balanced free of tension for a chain looping or other operation in a very simple manner. The invention is not, however, limited to thus producing a plurality of rubber threads in a balanced condition and free of tension, but may be utilized to equalize the tension on a plurality of any types of thread and to deliver such threads under any desired degree of tension. Thus, a plurality of textile threads, with or without rubber cores, as well as bare rubber threads, may be wound up on beams or on any wind-up device under the desired tension, which may be substantially no tension, if desired, or they may be fed to a loom or other textile machine free of tension or under any desired equalized tension.

In the drawings:

Figure 1 illustrates more or less diagrammatically one form of an apparatus for chain looping a plurality of rubber threads according to the present invention;

Fig. 2 is a plan view of the tension loosening device of Fig. 1; and

Fig. 3 is a section on the line 3—3 of Fig. 2.

In carrying out the invention, a plurality of rubber threads, which may be under uneven tensions, as from a number of spools on a creel or stand or the like, or a number of ends of rubber thread in a warp, or on a wind-up device, or a plurality of textile threads, with or without rubber cores, as from a number of spools in thread form, or from a number of drums or swifts in skein form, on a creel or stand or the like, or a number of such textile threads in loose condition, or on a wind-up device, may be passed through the tension equalizing device of the present invention and may be delivered from such device in a balanced condition and free from tension, or under any desired tension and equal tension for wind-up or fabricating or other operations. The tension equalizing device comprises a tension loosening device and a pulling device which acts to balance the threads and to permit their delivery in a balanced condition free of tension or under any desired tension and equal tension.

According to the invention, a plurality of threads from a creel of spools or other delivery apparatus, and which may be under varying tensions, are snubbed around a rotating traction device which acts as a tension loosening device to release the tensions on the threads, and the threads are pulled through the tension loosening device by a pulling device such as a power driven snubbing beamer or a pair of nip-rolls to deliver the threads in a balanced condition. The rotating traction device preferably takes the form of a series of rapidly rotating tapered rolls, the snubbed threads being pulled through by the nip rolls or other pulling device free of tension. The threads as delivered from the rotating tapered rolls will be free of tension but they may not be in a balanced condition due to each tapered roll operating as a cone pulley with high tension threads as delivered running on the high side of the cone and low tension threads running on the low side of the cone. The nip-rolls or pulling device, however, functions as a tension balancing unit when necessary, the threads being delivered from the nip rolls in a balanced condition and free of tension or under any desired tension. The rubber threads, for example, after delivery from the pulling device may be chain-looped in a known manner, since the threads unless associated with a second device rotating at a faster surface speed than the pulling device will be delivered from the pulling device in a balanced condition free of tension. The threads may, if desired, be delivered from the pulling device to a wind-up device, such as a beam or the like, or may be fed to a loom and the threads will be delivered all under the desired equalized tension, the tension being established, for example, by the difference in surface speed between the pulling device and the wind-up device, or beam, or other apparatus such as nip-rolls running at a faster surface speed than the pulling device.

Referring more particularly to the drawings which illustrate but one embodiment of the invention, namely, the balancing for chain-looping of a plurality of rubber threads from individual spools on which the threads have to be wound subsequent to the manufacturing operation, the threads T are fed from the individual spools 7 on a creel 8 under-tension, but under unequal tensions because of variations caused by the winding operation and variations in the threads themselves, and also by the tendency of the unwinding thread to stick between the adjacent wound coils to the tension loosening device 9, shown in detail in Figs. 2 and 3. The tension loosening device comprises in the main a traction means 10 around which the threads T under tension are snubbed, and which rotates in a direction tending to advance the threads, as shown by the arrow between the threads in Fig. 3. The traction means shown takes the form of a plurality of tapered drums 11 which may be of any convenient size and which may be separated from each other by circular flanges 12, the threads being snubbed around the tapered drums. The traction means is rotated at the desired speed by a motor 13 connected through a shaft coupling 14 to a shaft end 15 of the traction means. The shaft end 15 and the opposite shaft end 16 rotate in bearings 17 and 18 respectively. The traction means may be built in one piece in the form of a roll having tapered drum portions or may be assembled from individual drums. If desired, the traction means may comprise individual drums separately driven, rather than a connected series of drums driven from a common source as shown. In detail the threads T are drawn from the spools on the creel and are passed through a comb 19 and over a support 20 on the base 21. The threads pass through guides 22 secured to the base 21 above the drums 11 and are guided by fingers 23 so that the threads as they are fed will meet the drum surfaces at the large ends and after passing entirely around the drums leave them at their small ends. This prevents the snubbed threads from crossing on themselves on the surfaces of the drums. The threads pass from the traction means through guides 24 and a comb 26 on support 25.

The threads are then delivered to pull means such as the pair of nip-rolls 28, 29 which are operated at a predetermined speed to pull the threads forward from the snubbing rolls or drums 11. The threads T are preferably passed through the comb 27 before they reach the nip-rolls. It is important that the snubbing rolls or drums 11 be operated at a higher surface speed than the nip-rolls 28, 29 so that slack may occur in the threads T as they leave the drums 11 as will be apparent from Fig. 3.

The construction and operation is such that each thread is snubbed about a drum 11 which serves to pull it forward from its spool or other source of supply. If a thread being unwound from a spool 7 is under tension it will more tightly encircle the snubbing drum about which it is looped and this will cause such thread to be positively pulled forward until slack occurs at the delivery side of the drum 11 as shown in Figs. 1 and 3, whereupon this thread will slacken its grip about the snubbing drum and permit slippage upon the drum to thereby reduce the speed at which this thread is being pulled forward by the drum 11. This slippage will give the nip-rolls 28 and 29 a chance to take up the slack in front of the drum 11, whereupon the grip of the thread about the drum 11 will again be increased sufficiently to cause this drum to pull the thread forward from the source of supply.

In this manner the tension of each thread adjacent its snubbing drum 11 controls the rate at which it is drawn forward by its snubbing drum, and all threads are delivered by the snubbing mechanism to the nip-rolls 28, 29 under substantially the same tension. It will therefore be seen that as a result of the present construction the tension of each thread controls the rate at which it is pulled forward by the snubbing mechanism so as to deliver these threads to the nip-rolls 28, 29 in a straight condition and practically free from tension ready for warping or for chain-looping, regardless of original differences in tensions. The threads may be delivered to a wind-up device or beam or loom, or the like, under any desired equalized tension by having the surface speed of the wind-up device or beam or feed rolls to the loom, or the like, rotating at the desired faster speed than the nip-rolls 28, 29.

In operation the threads may be delivered from individual spools or drums or swifts on a creel or stand or the like, or from loose condition, or from a wind-up device to the tapered snubbing rolls. In making balanced warps of rubber threads, it is preferred to wind the individual threads on spools, place a plurality of the spools on a rack or creel, and pass the threads from a number of individual spools equal to the number of ends in the desired number of warps through the tension loosening device and the pulling device which deliver the threads ready for the chain-looping operation.

In view of the many changes and modifications that may be made without departing from the principles underlying the invention, reference should be made to the appended claims for an understanding of the scope of the invention.

Having thus described my invention, what I claim and desire to protect by Letters Patent, is:

1. In an apparatus for equalizing the tension of a plurality of threads, in combination, tapered snubbing drums each having a thread looped thereabout to draw the thread forward from a source of supply and adapted to permit its slippage upon the drum, means for operating the drums at the same speed, whereby the slippage of the threads about the drums and the rate at which the threads are pulled forward by the drums will vary with the tension of the individual threads to equalize their delivery tension.

2. In an apparatus for equalizing the tension of a plurality of threads supplied from independent sources, in combination, positive feed pull rolls, snubbing drums between said rolls and sources of thread supply and each snubbing drum having a thread looped thereabout so as to permit its slippage upon the drum, and means for rotating the drums, whereby the slippage of the threads about the snubbing drums and the rate at which the threads are pulled forward by the drums will vary with the tension of the individual threads to equalize their delivery tension.

3. In an apparatus for equalizing the tension of a plurality of elastic threads supplied from independent sources, in combination, means for positively pulling the threads forward at a predetermined speed, snubbing drum mechanism positioned between said pulling means and source of thread supply and having said threads looped thereabout, means for driving said snubbing mechanism at a higher peripheral speed than said pulling means whereby the slippage of the threads about the snubbing mechanism and the rate at which the threads are pulled forward thereby are controlled by the tension of the individual threads.

4. In an apparatus for equalizing the tension of a plurality of threads supplied from independent sources, in combination, means for pulling the threads forward at a predetermined speed, snubbing drum mechanism positioned between said pulling means and sources of thread supply and having said threads looped thereabout, means for driving said snubbing mechanism at a higher peripheral speed than said pulling means, and means for supporting said threads adjacent the snubbing mechanism whereby the tension of each thread will control its grip about said mechanism and the rate at which it is pulled forward thereby.

TAYLOR M. MORAN.